United States Patent

Lace

[15] 3,658,225

[45] Apr. 25, 1972

[54] MEANS FOR INCREASING THE PLAY TIME OF TAPE CARTRIDGES

[72] Inventor: Melvin A. Lace, Prospect Heights, Ill.

[73] Assignee: Motorola, Inc., Franklin Park, Ill.

[22] Filed: May 28, 1970

[21] Appl. No.: 41,488

[52] U.S. Cl. ............................... 226/90, 226/187, 226/176, 226/190

[51] Int. Cl. ............................... G11b 23/06

[58] Field of Search .................... 226/90, 181, 187, 176, 190, 226/118; 274/4 B, 4 C; 179/100.22

[56] References Cited

UNITED STATES PATENTS 3,526,371 9/1970 Blackie et al. ....................226/181 X 3,243,134 3/1966 Reed et al. ........................226/187 X 3,511,449 5/1970 Mathus et al. .....................226/190 X

*Primary Examiner*—Allen N. Knowles

*Attorney*—Mueller and Aichele

[57] ABSTRACT

A tape cartridge for insertion into a tape player has a tape transport wheel over which the tape within the cartridge moves during transport of the tape. The transport wheel is arranged to engage a drive capstan within the tape player which rotates at a given surface speed. The tape transport wheel includes means to transport the tape at a speed slower than the surface speed of the capstan drive of the tape player engaging the tape transport wheel.

1 Claims, 4 Drawing Figures

PATENTED APR 25 1972

3,658,225

Inventor
MELVIN A. LACE

BY

Mueller & Aichele
Attys.

MEANS FOR INCREASING THE PLAY TIME OF TAPE CARTRIDGES

BACKGROUND OF THE INVENTION

This invention relates to tape cartridges of the type insertable in an eight track, four channel tape player.

Tape cartridges are well-known in the art and are provided to house a quantity of magnetic tape generally which is prerecorded with audio signal information to be played back when the cartridge is inserted into a tape player. This is accomplished when a capstan drive within the tape player engages a drive wheel within the cartridge to transport the tape within the cartridge past a magnetic tape head within the tape player. The speed of transport of the tape within the cartridge is determined by the surface speed of the rotating capstan and the surface speed of the drive wheel within the cartridge engaging such capstan.

The quantity of tape contained within the cartridge is limited by the physical size of the cartridge. Therefore, the rate of transport of the tape within the cartridge determines the length of time the tape will play through the tape player.

One approach to increase the play time of the tape therein is to decrease the rate of rotation of the capstan drive engaging the drive wheel so that the tape transport speed will be correspondingly decreased. However, this is accomplished only with great difficulty in that all existing tape players presently being used would have to me modified which would be an expensive and unrealistic approach to say the least.

SUMMARY OF THE INVENTION

Accordingly, it is an object of this invention to provide an improved tape cartridge insertable into a tape player to engage a capstan drive therein, which cartridge includes means therein to increase the playing time of the tape.

Another object of this invention is to provide an improved tape cartridge which has means for maintaining the tape therein in pressure contact with the drive wheel during transport of the tape.

Briefly, the tape cartridge housing of this illustrated invention preferably is of a type to be inserted into an eight track stereo tape player of the type well-known in the art. The housing configuration of the cartridge is standard and will fit existing tape players of the appropriate type without any modification made thereto. Most advantageously, the tape transport wheel within the cartridge of this invention has a reduced diameter portion over which the tape rides at a speed slower than the surface speed of the capstan drive, thus increasing the play time of the cartridge.

A pressure idler wheel is provided in the cartridge to urge the tape firmly against the reduced diameter portion of the drive wheel at least during transport of the tape. Preferably, the pressure idler wheel may include means which only exerts pressure against the tape when the tape cartridge is inserted in a tape layer, and all other times the pressure idler wheel is disengaged. This will prevent flat sports from occurring at the contact surfaces between the pressure idler wheel and the reduced diameter portion of the drive wheel during periods of non-use of the tape cartridge.

BRIEF DESCRIPTION OF THE DRAWINGS

Like reference numerals throughout the various views of the drawings are intended to designate similar elements or components.

DESCRIPTION OF THE PREFERRED EMBODIMENTS

Figure 1:
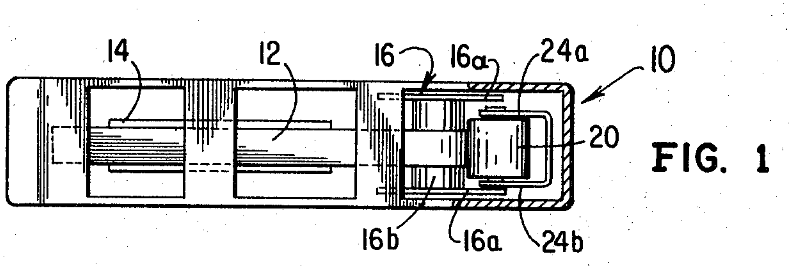
FIG. 1 is a front view of a tape cartridge constructed in accordance with the principals of this invention.
Figure 2:
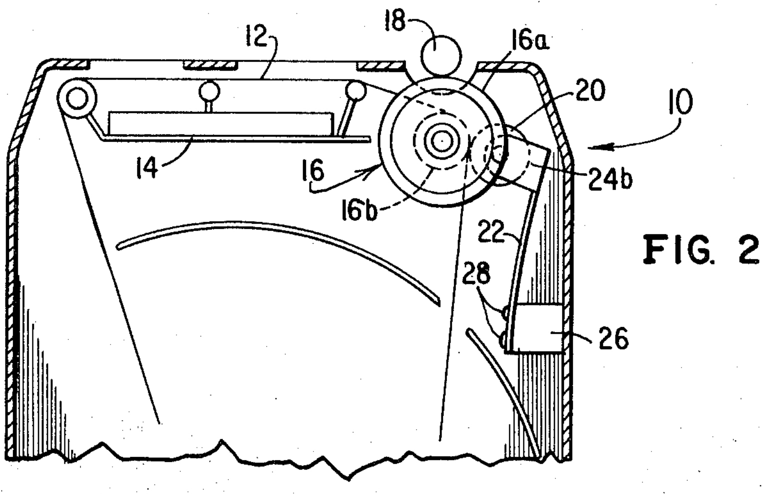
FIG. 2 is a plan view of the cartridge of FIG. 1 with the top wall removed exposing the interior thereof.

Referring now to FIGS. 1 and 2, there is seen a cartridge 10 constructed in accordance with the principals of this invention. The cartridge houses a quantity of magnetic tape 12 transported therein across a guide structure 14 during the playing operation. To transport the tape 12, a drive wheel 16 engages a capstan drive 18 in the usual manner. However, in accordance with this invention, the drive wheel 16 includes means to transport the tape through the cartridge 10 at a speed slower than the surface speed of the rotating capstan 18.

Preferably, the drive wheel 16 includes a pair of spaced apart major diameter portions 16*a* which engage the drive surface of the capstan 18 to rotate the drive wheel 16. A reduced diameter portion 16*b* provides a contact surface over which the tape 12 will move during the transport operation. A pressure idler roller 20 is urged against the tape 12 at the reduced diameter portion 16*b* to hold the tape firmly in driving contact with the drive wheel 16. The pressure idler roller 20 is supported by a pair of spaced apart arms 24*a* and 24*b* formed at the end of a resilient support 22 which, in turn, is fastened to a boss member 26 by rivets or screws 28.

The drive wheel 16 provides means for transporting the tape 12 at a speed slower than the surface speed of the capstan 18 which engages the major diameter portions 16*a* of the drive wheel 16. This is accomplished because the reduced diameter portion 16*b* rotates at a speed slower than the outer diameter portion 16*a*. The idler roller applies pressure to the tape to ensure positive transport thereof. This feature enables a longer play time of the tape within the cartridge 10.

Figure 3:
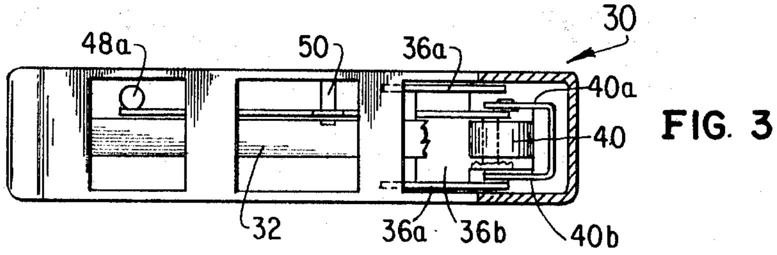
FIG. 3 is a front view of an alternate form of cartridge constructed in accordance with this invention.
Figure 4:
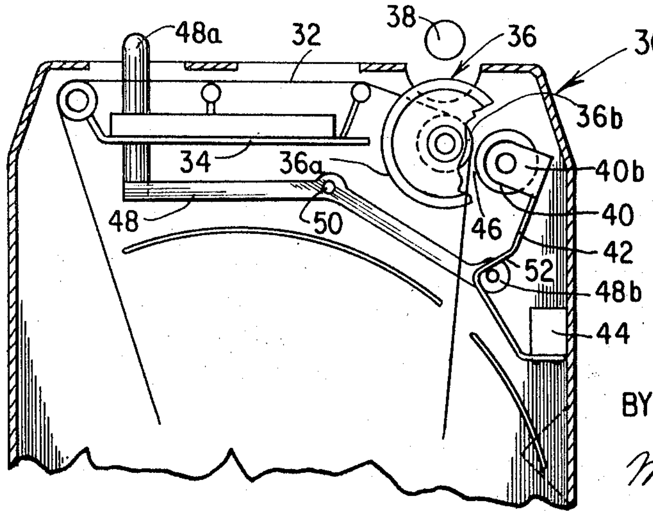
FIG. 4 is a plan view of the cartridge of FIG. 3 with the top wall removed to expose components within the cartridge.

Referring now to FIGS. 3 and 4, there is seen an alternate embodiment of this invention. Here a tape cartridge 30 houses a quantity of magnetic tape 32 which passes over a guide structure 34 during the tape transport operation. A drive wheel 36 will engage a drive capstan 38 and thus transport the tape during the playing operation. Here also, the drive wheel 36 includes spaced apart major diameter portions 36*a* which frictionally engage the surface of the capstan 38. The drive wheel 36 includes a reduced diameter portion 36*b* over which the tape 32 passes during transport thereof.

A pressure idler roller 40 is positioned within the cartridge 30 but is spaced away from the back surface of the tape 32 and reduced diameter portion 36*b* until such time as the cartridge 30 is inserted into the tape player. The pressure idler roller 40 is supported by a pair of spaced apart arms 40*a* and 40*b* which lead into a resilient member 42 extending from and secured to a boss 44. The member 42 may be a rigid unit pivotal at a point to move toward and away from the drive wheel 36. In this embodiment, however, the member 42 may be considered either resilient or pivotal.

It can be seen in FIG. 4 that the surface of the pressure idler roller 40 is spaced from the tape 32 and reduced diameter portion 36*b* by a gap 46. A lever arm 48 is pivotally secured within the housing 30 at a pivot point 50. One end of the arm 48 includes an extensible member 48*a* extending from an opening of the cartridge housing to engage with suitable abutment means of the tape player, not shown, to apply pressure to and rotate the pivotal arm 48 about the pivot point 50. That is, the pivotal arm 48 rotates about the axis 50 when the cartridge 30 is inserted into a tape player. This action will cause a slideable guide member 48*b* to engage the slanted surface portion 52 of the resilient member 42 to urge the pressure idler roller firmly against the tape 32 in the area where it is wrapped about the reduced diameter portion 36*b*. This feature prevents flat spots from occurring along the contact area between the pressure idler roller 40 and reduced diameter portion 36*b* when the cartridge is not in use.

Accordingly, what has been disclosed herein is a simple and effective method of increasing the play time of a given quantity of tape within a tape cartridge without changing the speed of rotation of a capstan shaft within a tape player.

I claim:

1. A tape cartridge for insertion into a tape player which has a capstan drive to engage the cartridge and transport the tape therein, comprising in combination;

a housing;

a tape transport wheel within said housing about which the tape within said housing is drivingly guided during transport thereof;

opening means formed in said housing to allow the capstan drive of the tape player to engage said tape transport wheel and rotate the same at a predetermined speed;

means associated with said tape transport wheel to transport the tape at a speed slower than the surface speed of said capstan drive;

a pressure wheel;

and means resiliently mounting said pressure wheel in said housing including a resilient support arm, and a pivotal lever mounted within the cartridge to have one end thereof engaging said resilient support arm and the other end thereof extending from the cartridge to engage a portion of the tape player which receives the tape cartridge to pivot the lever and resiliently urge said pressure wheel against the tape with the same passing over said drive wheel when the cartridge is inserted into a tape player.

* * * * *